United States Patent [19]

Schönenberger et al.

[11] Patent Number: 5,388,703
[45] Date of Patent: Feb. 14, 1995

[54] SORTING METHOD

[75] Inventors: Rolf Schönenberger; Robby Enderlein, both of Landsberg/Lech; Johann Robu, Olching, all of Germany

[73] Assignee: RSL Logistik, Landsberg/Lech, Germany

[21] Appl. No.: 102,135

[22] Filed: Aug. 2, 1993

[30] Foreign Application Priority Data

Aug. 6, 1992 [DE] Germany .................. 4226066

[51] Int. Cl.⁶ .................................... B07C 5/00
[52] U.S. Cl. .................... 209/44.1; 209/657; 209/937; 198/366; 198/465.4
[58] Field of Search ............ 198/362, 365, 366, 367, 198/368, 369, 465.4, 606; 209/937, 912, 44.1, 657

[56] References Cited

U.S. PATENT DOCUMENTS

| | | | |
|---|---|---|---|
| 2,845,034 | 7/1958 | Harrison | 198/366 X |
| 2,998,136 | 8/1961 | Gerisch | 198/366 X |
| 3,343,648 | 9/1967 | Rakel | 198/362 |
| 3,454,148 | 7/1969 | Harrison | 198/369 X |
| 3,982,623 | 9/1976 | DePas et al. | 198/362 |
| 4,069,764 | 1/1978 | Teyssedre | 198/465.4 X |
| 4,854,439 | 8/1989 | Ueda | 198/350 |
| 4,917,228 | 4/1990 | Ichihashi et al. | 198/350 X |
| 4,940,127 | 7/1990 | Kikuchi et al. | 198/350 |
| 4,977,996 | 12/1990 | Duce | 198/465.4 X |
| 4,991,719 | 2/1991 | Butcher et al. | 198/465.4 X |
| 5,062,524 | 11/1991 | Nozaki et al. | 198/366 X |
| 5,147,048 | 9/1992 | Signoretto | 198/369 X |
| 5,238,122 | 8/1993 | Hart | 209/937 X |

FOREIGN PATENT DOCUMENTS

| | | | |
|---|---|---|---|
| 2409999 | 4/1975 | Germany . | |
| 9106057 | 4/1991 | Germany . | |
| 0255313 | 11/1987 | Japan | 198/350 |

*Primary Examiner*—D. Glenn Dayoan
*Attorney, Agent, or Firm*—Armstrong, Westerman, Hattori, McLeland & Naughton

[57] ABSTRACT

There is described a method of sorting a plurality of individually conveyed articles in a suspension-type conveyor apparatus, wherein the articles circulate along a first conveyor circuit in unsorted fashion and are transferred from there individually and automatically to at least a second conveyor path and arranged in groups. To make such a method more simple and less troublesome, it is suggested that the second conveyor path be designed as a second conveyor circuit along which the articles circulate and that an automatically switchable shunt be provided between the first and second conveyor circuits. Both, the first conveyor circuit and the second conveyor circuit, are closed loop and reversibly driven.

8 Claims, 2 Drawing Sheets

SORTING METHOD

BACKGROUND

1. Field of the Invention

This invention relates to a method of sorting a plurality of conveyed articles in a suspension-type conveyor means, the articles circulating on a first conveyor circuit in unsorted fashion and being delivered from there individually and automatically to at least one second conveyor path and arranged in groups.

Such a method is known from GB-A-2 079 708. In the known method, garments which are hanging on cloth hangers are hung in unsorted fashion and by hand individually onto a conveyor circulating within a closed conveyor circuit in predetermined direction. Each individual cloth hanger is retained on the conveyor by means of a latch member which must be opened automatically. The circulating conveyor is guided past a multitude of conveyor rods which are formed as a second conveyor path for a respective group of predetermined articles. Discharge rods which are positioned below the cloth hanger hooks and intercept each hanger whose latch member has been opened above the discharge rod are positioned between the slide rods and the conveyor circuit. The articles, however, must be discharged in their predetermined order within the arranged group from the conveyor circuit on the known conveyors which are formed as dead-end sections. This means that a specific article which is actually to be transferred on a specific slide rod has to be passed in the first conveyor circuit past its slide rod so many times until all articles collecting in front of it on its slide rod have been ejected. The known method is therefore very time-consuming.

2. Related Prior Art

Furthermore, it is known as a general sorting principle of the so-called associated order-picking method that presorted articles are brought together by clocked circulation in a conveyor circuit with conveyor means that respectively receive a specific group of finally sorted articles, the conveyor means rotating also in clocked fashion along a second conveyor circuit. The transfer, however, is most of the time carried out by hand or with the aid of complicated shifting means and never out of the conveying movement (the conveyor and the type of article must be stopped in step for each transfer). Consequently, only presorted articles are transferred.

SUMMARY OF THE INVENTION

It is therefore the object of the present invention to provide a fast, simple and uncomplicated method of sorting a plurality of individually conveyed articles.

This object is attained by forming a second conveyer path as a second conveyor circuit along which articles circulate, and arrangine an automatically switchable shut between the first and second conveyors.

The articles can be transferred from the first conveyor circuit to the respectively desired position between the articles rotating along the second conveyor circuit by the measure of the invention, i.e. to guide the conveyor means also in the second conveyor path within a closed circuit. Moreover, a plurality of different groups of articles may be collected on the second conveyor circuit without a specific sequence of the groups having to be observed among the groups.

BRIEF DESCRIPTION OF THE DRAWINGS

An embodiment of the invention shall now be explained in more detail with reference to a conveyor means shown in the drawings.

DESCRIPTION OF PREFERRED EMBODIMENTS

Figure 1:
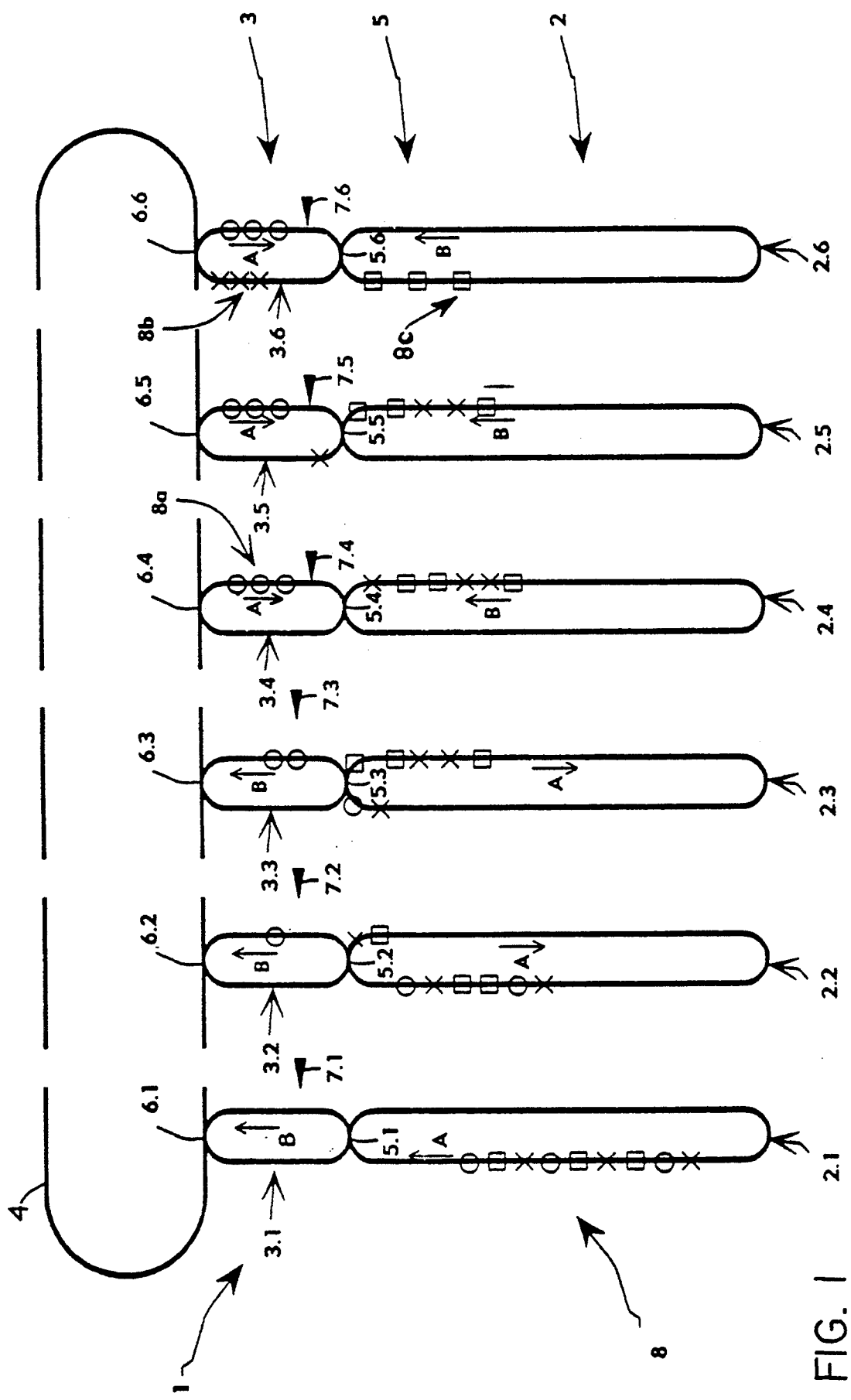
FIG. 1 is a first embodiment of a layout of a conveyor means that incorporates the features of the present invention.

In the illustrated embodiment, the conveyor means 1 includes six first conveyor circuits 2.1, 2.2, 2.3, 2.4, 2.5 and 2.6. A second conveyor circuit 3.1, 3.2, 3.3, 3.4 3.5 and 3.6 is respectively assigned to each of the first conveyor circuits 2.1 to 2.6. Each of the second conveyor circuits 3.1 to 3.6, in turn, is assigned to a common discharge conveyor 4.

Each of the first and second conveyor circuits 2.1 to 2.6 and 3.1 to 3.6, respectively, consists of two straight parallel conveyor sections which are interconnected via a deflection point of curved shape. A respective shunt 5.1, 5.2, 5.3, 5.4, 5.5 and 5.6 which is preferably arranged between two abutting deflection points of the first and second conveyor circuits is respectively positioned between a first conveyor circuit 2.1 to 2.6 and the second conveyor circuit 3.1 to 3.6 assigned thereto. By analogy, each of the second conveyor circuits 3.1 to 3.6 is connected to the discharge conveyor 4 via another shunt 6.1, 6.2, 6.3, 6.4, 6.5, 6.6. Shunts 6.1 to 6.6 preferably connect the deflection points of the second conveyor circuits 3, which are opposite to shunts 5, to a straight conveyor section of the discharge conveyor 4. As illustrated, the discharge conveyor 4 may also be formed as a conveyor circuit or just contain a straight conveyor path.

The conveyor circuits 2 and 3 may be driven independently of each other and also at different speeds along both arrow A in a forward direction and arrow B in a rearward direction. Moreover, each of the second conveyor circuits may have assigned thereto a stopper 7.1, 7.2, 7.3, 7.4, 7.5 and 7.6 which is movable from an effective position into an ineffective position. Finally, known identification means, such as reading devices or the like, may be provided for all articles 8 moving within conveyor means 1. The identification means serves in a known way via a known control means (not shown) to control shunts 5 and 6 and the drive of the conveyor circuits 2 and 3, respectively.

Different articles 8 circulate along the first conveyor circuits 2 in unsorted fashion and random order. To simplify the illustration, only three types of articles 8 are shown, each type being marked by a symbol of its own, i.e. a circle, a square or a cross. It is assumed that all articles marked with a circle are first to be sorted and transferred to the second conveyor circuit 3.

To simplify the illustration, the six combinations that are shown in the drawing and respectively consist of first and second conveyor circuits represent a respective step of the sorting operation. It should however be clear that the entirety of the steps shown must be performed at each pair of conveyor circuits; each of the steps can be performed on a pair of conveyor circuits simultaneously with exactly the same step on the adjacent pair of conveyor circuits.

To sort out the articles 8 marked with a circle from the quantity of unsorted articles 8 which randomly rotate along the first conveyor circuit 2.1 in direction A, the associated second conveyor circuit 3.1 is driven in the direction of arrow B, so that the two conveyor circuits 2.1 and 3.1 extend substantially in parallel in the area of shunt 5.1. If the identification apparatus indicates that an article marked with a circle will arrive as the next article 8 at shunt 5.1, the shunt is switched over and guides the article to the second conveyor circuit. This state is illustrated with reference to the conveyor circuits 2.2 and 3.2. If articles marked with a cross or a square follow after the transfer of the article, the shunt switches back again and leaves these articles on the first conveyor circuit 2. As soon as an article marked with a circle arrives at shunt 5 again, the shunt is switched again and the article is transferred to the second conveyor circuit 3. This is repeated until all articles marked with a circle have collected in a first group 8a on the second conveyor circuit 3. This state is shown with reference to the pair of conveyor circuits 2.4, 3.4. The collected group of articles may be discharged onto the discharge conveyor 4 either immediately or, as described further below, may temporarily be stored on the collecting second conveyor.

If another group 8b of articles is to be collected on the second conveyor circuit 3, stopper 7.4 is expediently slid into the conveyor path of group 8a on the second conveyor circuit 3.4 and the rotary direction of both the first conveyor circuit 2 and the second conveyor circuit 3 is reversed, so that the first conveyor circuit now rotates in the direction of arrow B and the second conveyor circuit in the direction of arrow A. The already collected group 8a is retained by stopper 7 with respect to the movement of the second conveyor circuit 3 towards shunt 5. This has the effect that articles marked with a cross are prevented from unintentionally passing between the articles of the first group 8a. The transfer of all articles marked with a cross is carried out analogously with the collection of group 8a. Finally, the articles marked with a square may also remain in a third group 8c either on the first conveyor circuit or in an analogous way on the second conveyor circuit.

After groups 8a, 8b, 8c have been collected, they may be discharged via shunts 6 onto the discharge conveyor 4. However, it is also possible to eject the collected groups from the second conveyor circuit in groups back onto the first conveyor circuit and to store them there. The storing capacity can decisively be enlarged in this way and the space which is normally needed in addition to the space for a storing means can be saved for a sorting device. Furthermore, it is possible with the method of the invention to fix the order of the articles collected in groups 8a to 8c independently of the order of said articles on the first conveyor circuit 2 because the articles can be transferred from the first conveyor circuit to any desired point of the second conveyor circuit, i.e. also between two articles that have already been collected. If the controls of the first and second conveyor Circuits are suitably matched, it is also possible to collect two or more different groups on the second conveyor circuits at the same time, the second conveyor circuit being moved to the desired place in response to the type of article approaching shunt 5 on the first conveyor circuit.

The conveyor means used for the method according to the invention should contain a collecting conveyor at least for the second conveyor circuit if a plurality of groups are to be collected there, the drive being adapted to run continuously in uninterrupted fashion with this type of conveyor even if articles are retained by stopper 7 with respect to the conveying movement. Moreover, the shunts which are positioned between the first and second conveyor circuits should have short switching times and a small constructional length in the conveying direction, so that the distance of the articles circulating on the first conveyor circuit need not be too great.

Figure 2:
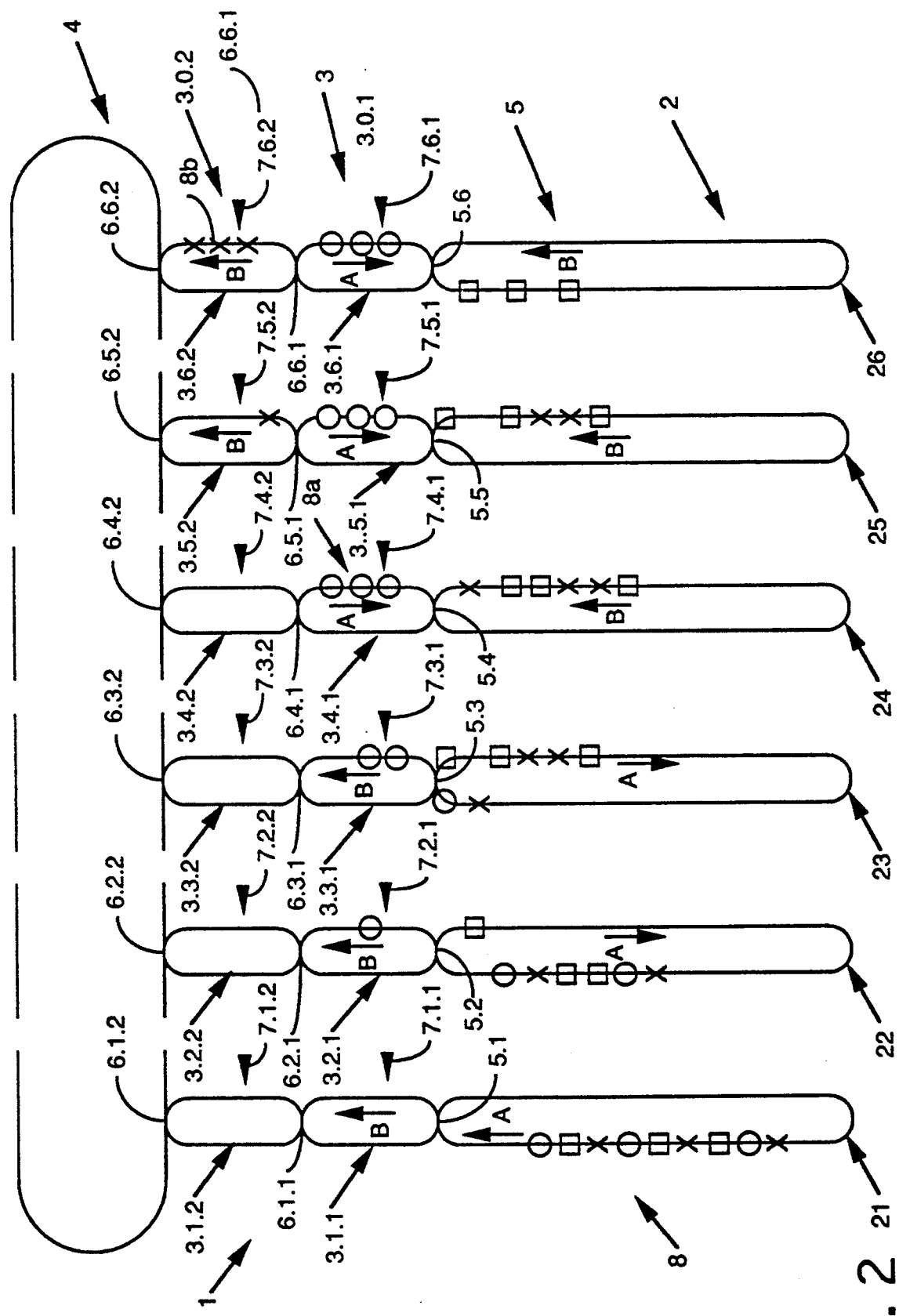
FIG. 2 is a modification of the apparatus shown in FIG. 1, comprising two second conveyor circuits assigned to each first conveyor circuit.

In the embodiment of FIG. 2, a plurality of second conveyor circuits 3.01 and 3.02 which are fed in the above-described way may be assigned to each of the first conveyor circuits 2. A group of specific articles 8a, 8b may be assigned to each of the second conveyor circuits 3.0.1, 3.0.2 and the side of the conveyor circuit 3.0.1 which is provided with the stopper 3.1.1 to 3.6.1 may be used as a storing section for said specific articles 8a while all other articles are passed to the next conveyor circuit. The articles of a second group 8b are there sorted out and all other articles are transferred to the next but one conveyor circuit, etc. Before the beginning of the sorting process, the desired order of the groups after sorting is determined. Moreover, the second conveyor circuit may directly be formed as a discharge conveyor.

We claim:

1. A method of sorting a plurality of individually conveyed articles in a suspension-type conveyor means, the articles circulating around a first closed loop reversibly driven conveyor circuit in unsorted fashion and being delivered from there individually and automatically to at least one second conveyor path and arranged in groups, which comprises forming said at least one second conveyor path as at least one second conveyor closed loop reversibly driven circuit around which the articles are circulated until removed therefrom, arranging a first automatically switchable shunt between said first and said at least one second conveyor circuits, actuating the first shunt and thereby moving at least one group of articles of a common selected characteristic from the first conveyor circuit onto the second conveyor circuit around which they circulate as a group, arranging a second switchable shunt between the second conveyor circuit and a discharge conveyor, and actuating the second shunt and thereby moving a group of articles having the same selected characteristic from said at least one second conveyor circuit to the discharge conveyor.

2. A method according to claim 1, comprising collecting on a second conveyor circuit a plurality of groups of associated articles having the same selected characteristic.

3. A method according to claim 1 or 2, characterized in that a plurality of second conveyor circuits are assigned to said first conveyor circuit.

4. A method according to claim 3, comprising connecting all of said second conveyor circuits to a common discharge conveyor.

5. A method according to claim 2, comprising inserting a stopper means into the conveyor path of a first group of associated articles circulating around a second conveyor circuit, and reversing the direction of circulation of articles in the first and second conveyor circuits.

6. A method according to claim 5, wherein, on reversing the direction of circulation of articles in the first and second conveyor circuits, at least one group of associated articles is transferred from said second conveyor circuit to said first conveyor circuit for storage there.

7. A method according to claim 1 or 2, comprising transferring articles from one of said conveyor circuits to the other of said conveyor circuits in the area of a deflection point of a conveyor circuit having a long oval shape.

8. A method according to claim 1 or 2, wherein collecting conveyors are used for said second conveyor circuit.

* * * * *